United States Patent
Dahman et al.

(10) Patent No.: US 6,339,799 B1
(45) Date of Patent: *Jan. 15, 2002

(54) METHOD OF REPOSITIONING AN I/O DEVICE TO A PREDETERMINED POSITION TO RETRY A PROGRAM WITHOUT KNOWLEDGE OF WHICH PART OF THE PROGRAM CAUSED THE RETRY

(75) Inventors: Kirby G. Dahman, Tuscon, AZ (US); Gavin S. Johnson, Aromas; Larry R. Perry, Gilroy, both of CA (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/181,744

(22) Filed: Oct. 29, 1998

(51) Int. Cl.⁷ .............................................. G06F 13/14
(52) U.S. Cl. ...................... 710/21; 709/203; 711/147; 711/157; 714/6
(58) Field of Search ........................ 710/21; 709/203; 711/4, 147, 157; 714/6

(56) References Cited

U.S. PATENT DOCUMENTS

| | | | |
|---|---|---|---|
| 3,564,502 A | * 2/1971 | Boehner et al. | 340/172.5 |
| 3,688,274 A | * 8/1972 | Cormier et al. | 340/172.5 |
| 4,201,976 A | 5/1980 | Patel | 371/50 |
| 4,209,809 A | 6/1980 | Chang et al. | 360/53 |
| RE31,069 E | 10/1982 | Chang et al. | 360/53 |
| 4,549,295 A | 10/1985 | Purvis | 371/13 |
| 4,688,221 A | 8/1987 | Nakamura et al. | 371/13 |
| 4,932,826 A | 6/1990 | Moy et al. | 414/277 |
| 4,993,030 A | 2/1991 | Krakauer et al. | 371/40.1 |
| 5,172,381 A | 12/1992 | Karp et al. | 371/42 |
| 5,331,476 A | 7/1994 | Fry et al. | 360/53 |
| 5,386,324 A | 1/1995 | Fry et al. | 360/53 |
| 5,446,872 A | 8/1995 | Ayres et al. | 395/180 |
| 5,455,926 A | 10/1995 | Keele et al. | 395/404 |
| 5,490,149 A | 2/1996 | Nylander-Hill | 395/182.3 |
| 5,526,484 A | 6/1996 | Casper et al. | 395/200.14 |
| 5,539,914 A | 7/1996 | Fry et al. | 395/827 |
| 5,546,533 A | 8/1996 | Koyama | 395/182.03 |
| 5,615,329 A | 3/1997 | Kern et al. | 395/182.04 |
| 5,619,644 A | 4/1997 | Crockett et al. | 395/183.21 |
| 5,734,818 A | 3/1998 | Kern et al. | 395/182.18 |

(List continued on next page.)

OTHER PUBLICATIONS

"Staged Read Error Recovery For a Magnetic Tape Subsystem", IBM Technical Disclosure Bulletin, vol. 35, No. 3, pp. 412–414 (Aug. 1992).

"Pointer Collection and Reporting for Error Recovery Procedures Branching", IBM Technical Disclosure Bulletin, vol. 39, No. 7, pp. 87–89 (Jul. 1996).

"Adaptive Digital Readback Equalization For Recording Devices", IBM Technical Disclosure Bulletin, vol. 35, No. 7, pp. 43–44 (Dec. 1992).

*Primary Examiner*—Thomas Lee
*Assistant Examiner*—Abdelmoniem Elamin
(74) *Attorney, Agent, or Firm*—Andrew J. Wojnicki, Jr., Esq.; Lily Neff, Esq.; Heslin Rothenberg Farley & Mesiti P.C.

(57) ABSTRACT

Repositioning within an input/output device is accomplished without any knowledge of where the input/output device is currently positioned. The input/output device is repositioned to a predetermined position, in order for a program to be retried. The predetermined position is determined from a previously executed program. The previously executed program is scanned looking for commands. For each command found, a position identifier is adjusted based upon the type of command. When the scan and adjustments are complete, the position identifier represents the predetermined position used for repositioning the input/output device.

19 Claims, 9 Drawing Sheets

U.S. PATENT DOCUMENTS

| | | |
|---|---|---|
| 5,765,200 A | 6/1998 | McIlvain et al. ............ 711/170 |
| 5,911,040 A * | 6/1999 | Hirayama et al. ............ 714/38 |
| 6,031,991 A * | 2/2000 | Hirayama ................... 395/704 |
| 6,055,602 A | 4/2000 | McIlvain et al. ............ 711/112 |
| 6,115,781 A * | 9/2000 | Howard ......................... 711/4 |
| 6,173,417 B1 * | 1/2001 | Merrill ........................ 714/15 |

* cited by examiner

INTERRUPTION RESPONSE BLOCK

METHOD OF REPOSITIONING AN I/O DEVICE TO A PREDETERMINED POSITION TO RETRY A PROGRAM WITHOUT KNOWLEDGE OF WHICH PART OF THE PROGRAM CAUSED THE RETRY

CROSS-REFERENCE TO RELATED APPLICATIONS

This application contains subject matter which is related to the subject matter of the following applications, each of which is assigned to the same assignee as this application and filed on the same day as this application. Each of the below listed pending applications is hereby incorporated herein by reference in its entirety:

"SYSTEM OF REPOSITIONING AN INPUT/OUTPUT DEVICE WITHOUT KNOWLEDGE OF CURRENT POSITIONING OF THE DEVICE" by Dahman et al., Ser. No. 09/181,704 and "PROGRAM PRODUCTS FOR REPOSITIONING AN INPUT/OUTPUT DEVICE WITHOUT KNOWLEDGE OF CURRENT POSITIONING OF THE DEVICE," by Dahman et al., Ser. No. 09/181,966.

TECHNICAL FIELD

This invention relates, in general, to recovery techniques for programs executed on position sensitive input/output devices and, in particular, to repositioning an input/output device in order to retry a program.

BACKGROUND ART

A requirement of any robust computing environment is to be able to recover from errors, such as device hardware errors (e.g., mechanical, electrical) or recording media errors. In order to recover from some device or media errors, it is necessary to restart a program, either from the beginning or from some other point within the program. The restarting of a program, however, poses certain challenges, especially when the input/output device in which the program is executed is position sensitive.

Conventionally, with position sensitive devices, such as magnetic tape units, the position of the device when the programming error occurred is needed in order to restart the program. This position, however, is difficult to determine for some programs.

For example, when an error is encountered in a channel program that allows pipelining, it is difficult to know where the device was positioned when the error occurred. A channel program includes one or more channel command words. Some channel programs that have a plurality of channel command words allow pipelining of those channel command words. This means that a number of the channel command words may be initiated prior to receiving a response for any one of the command words. Thus, if an error has been detected for a second channel command word, as one example, but the control unit is already processing the fifth channel command word, then the device is positioned past the error and the position within the device of where the error occurred is unknown.

Thus, a need exists for a capability that enables an input/output device to be repositioned, even when the position of the input/output device when the error occurred is unknown. Further, a need exists for a capability that enables an input/output device to be repositioned without any knowledge of current positioning within the device. A further need exists for an enhanced capability that enables programs to be restarted, even when the program has been modified or the last known block-id representing the position of the input/output device is invalid.

SUMMARY OF THE INVENTION

The shortcomings of the prior art are overcome and additional advantages are provided through the provision of a method of repositioning within an input/output device. The method includes, for instance, ascertaining that a program, that was executing on an input/output device sensitive to positioning, is to be retried; and repositioning the input/output device to a predetermined position in order to retry the program. The repositioning is performed without knowledge of current positioning within the input/output device.

In one embodiment, the method further includes determining the predetermined position. For example, the determining includes scanning a previously executed program for command; adjusting a position identifier of the input/output device based upon a type of the command; and repeating the scanning and the adjusting until a prespecified limit is reached. The position identifier then represents the predetermined position.

In another embodiment, the adjusting includes incrementing the position identifier when the command is an Add type; decrementing the position identifier when the command is a Delete type; and invalidating the position identifier when the command is an Invalidate type.

In a further embodiment of the present invention, the program is a channel program including one or more channel command words. Additionally, the determining of the predetermined position includes scanning a previously executed channel program for a channel command word; adjusting a block-id of the input/output device based upon a type of operand of the channel command word; and repeating the scanning and the adjusting for each channel command word of the previously executed channel program.

In another aspect of the present invention, a method of repositioning within an input/output device is provided. The method includes, for instance, determining a position, within an input/output device sensitive to positioning, that is to be used to retry a program. The determining uses a first address representative of where a channel associated with an input/output device stopped processing the program and a second address representative of where a control unit associated with the input/output device stopped processing the program. The method further includes repositioning the input/output device to the position in order to retry the program.

In accordance with the principles of the present invention, a repositioning capability is provided that enables an input/output device to be repositioned without knowing the current position of the device or where an error occurred within the device. The repositioning capability of the present invention allows for enhanced error recovery on various interface types (e.g., parallel Original Equipment Manufacturers' Information (OEMI), Enterprise Systems Connection Architecture (ESCON), Fiber Connection (FICON) and internal tape) for various input/output errors. The capabilities of the present invention allow the operating system to improve the reliability of input/output devices on errors where the ending channel command word cannot even be determined and which previously had to be treated as a permanent error (e.g., interface control check or channel control check with an invalid CCW address). Further, the repositioning capability of the present invention is applicable to any device where the software depends on media positioning to be able to recover from errors.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, a capability is provided for repositioning an input/output device in order to retry a program. The repositioning is performed without any knowledge of current positioning within the input/output device or of any knowledge of where the program previously completed. That is, the repositioning capability of the present invention is irrespective of and independent of current device positioning.

Figure 1:
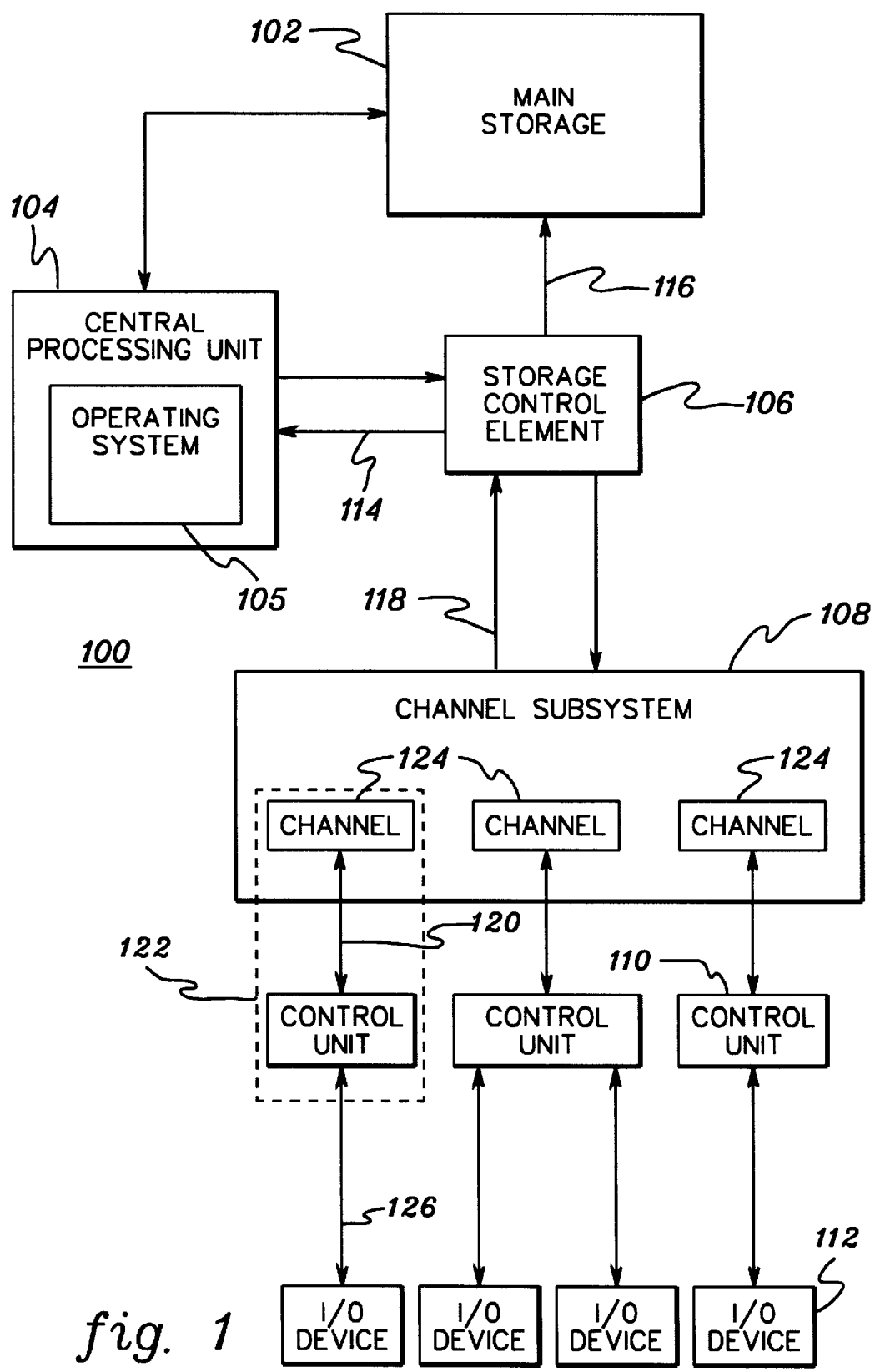
FIG. 1 depicts one example of a computing environment incorporating and using the capabilities of the present invention.

One embodiment of a computing environment 100 incorporating and using the repositioning capability of the present invention is depicted in FIG. 1. Computing environment 100 is based, for instance, on the Enterprise Systems Architecture (ESA)/390 offered by International Business Machines Corporation. ESA/390 is described in the following references: "Enterprise Systems Architecture/390 Principles of Operation", IBM Publication No. SA22-7201-04, June 1997; and "Enterprise Systems Architecture/390 Common I/O Device Commands", IBM Publication No. SA22-7204-02, August 1995, each of which is hereby incorporated herein by reference in its entirety.

As one example, computing environment 100 includes a main storage 102, one or more central processing units (CPU) 104, a storage control element 106, a channel subsystem 108, one or more control units 110 and one or more input/output (I/O) devices 112, each of which is explained below.

Main storage 102 stores data and programs which are input from input devices 112. Main storage 102 is directly addressable and provides for high-speed processing of data by central processing unit(s) 104 and channel subsystem 108. In one example, main storage 102 includes a customer storage area and a system area (not shown).

Central processing unit 104 is the controlling center of computing environment 100. As is known, central processing unit 104 executes at least one operating system 105, which is used to control the operation of the computing environment by controlling execution of other programs, controlling communication with peripheral devices and controlling use of the computer resources. Further, in accordance with the principles of the present invention, operating system 105 is enhanced with the repositioning capabilities of the present invention.

One example of an operating system, which includes the capabilities of the present invention, is the OS/390 or Multiple Virtual Storage (MVS)/ESA operating system offered by International Business Machines Corporation.

Central processing unit 104 is coupled to storage control element 106 via a bidirectional bus or a unidirectional bus 114. The storage control element is further coupled to main storage 102 via a bus 116 and to channel subsystem 108 via a double word bus 118. Storage control element 106 controls, for example, the queuing and the execution of requests made by CPU 104 and channel subsystem 108.

Channel subsystem 108 is further coupled to each of the control units via a serial link 120. Channel subsystem 108 directs the flow of information between input/output devices 112 and main storage 102. It relieves the central processing unit(s) of the task of communicating directly with the input/output devices and permits data processing to proceed concurrently with input/output processing. The channel subsystem uses one or more channel paths 122 as the communication links in managing the flow of information to or from input/output devices 112. As a part of the input/output processing, channel subsystem 108 also performs the path-management function of testing for channel path availability, selecting an available channel path and initiating execution of the operation with the input/output device.

Each channel path 122 includes a channel 124 (located within the channel subsystem), one or more control units 110 and one or more connections 120. As examples, connections 120 may be serial links based on the Enterprise Systems Connection Architecture (ESCON) (described in detail in "Enterprise Systems Architecture/390 ESCON I/O Interface", Form No. SA22-7202-02 (August 1992), which is hereby incorporated herein by reference in its entirety); parallel OEMI attachments (described in detail in "Enterprise Systems Architecture/390, System/360 and System/370 I/O Interface Channel to Control Unit Original Equipment Manufacturers' Information", Document Number GA22-6974-10 (September 1992), which is hereby incorporated herein by reference in its entirety); a fiber channel (FICON) bridge or other fiber channel attachments.

In another example, it is also possible to have one or more dynamic switches as part of the channel path. A dynamic switch is coupled to a channel and a control unit and provides the capability of physically interconnecting any two links that are attached to the switch.

Also located within channel subsystem 108 are subchannels (not shown). One subchannel is provided for and dedicated to each input/output device accessible to the channel subsystem. A subchannel provides the logical appearance of a device to the program. Each subchannel provides information concerning the associated input/output device 112 and its attachment to channel subsystem 108. The subchannel also provides information concerning input/output operations and other functions involving the associated input/output device. The subchannel is the means by which channel subsystem 108 provides information about associated input/output devices 112 to central processing unit(s) 104, which obtain this information by executing input/output instructions.

The subchannel consists of internal storage that contains the information in the form of a channel command word (CCW) address, channel path identifier, device number, count, status indications, and input/output interruption subclass code, as well as information on path availability and functions pending or being performed. Input/output operations are initiated with device 112 by executing input/output instructions that designate the subchannel associated with the device.

Each control unit 110 provides the logic to operate and control one or more input/output devices and adapts, through the use of common facilities, the characteristics of each input/output device to the link interface provided by the channel. The common facilities provide for the execution of input/output operations, indications concerning the status of the input/output device and control unit, control of the timing of data transfer over the channel path and certain levels of input/output device control.

Each control unit 110 is attached via a bus 126 to one or more input/output devices 112. In one embodiment, each control unit may be attached to up to 256 input/output devices. Input/output devices 112 receive information from or store information in main storage 102. Examples of input/output devices include card readers and punches, magnetic-tape units, direct-access storage devices, displays, keyboards, printers, teleprocessing devices, communication controllers, sensor-based equipment, and other storage media.

The writing of data from main storage to the input/output devices or the reading of data from the input/output devices to main storage is accomplished by executing input/output operations. The execution of input/output operations is accomplished by the decoding and executing of channel programs by the channel subsystem and the input/output devices. In particular, it is the decoding and executing of the one or more channel command words of each of the channel programs.

In one embodiment, the processing of each channel command word is completed before the processing of the next channel command word begins. That is, a command and any associated data is sent from the channel to the control unit and an appropriate response is received from the control unit before a new command can be sent. However, in another embodiment, the processing of a number of channel command words may be initiated before any response is received from the control unit. This is referred to as pipelining of the processing of channel command words, which is further described in U.S. Pat. No. 5,526,484, Casper et al., entitled "Method and System For Pipelining The Processing of Channel Command Words," issued on Jun. 11, 1996 and assigned to International Business Machines Corporation, which is hereby incorporated herein by reference in its entirety.

In accordance with the principles of the present invention, a program can be retried in the event the program did not end successfully, the program ended prematurely or for any other reason that retry is desired. One example of such a program is a channel program either with or without pipelining.

In the particular embodiment described herein, the programs are stored on position sensitive input/output devices, such as tape devices, as one example. Thus, in order to retry the program, the input/output device is repositioned to, for instance, the beginning of the channel program. This repositioning is performed without having any knowledge of the current positioning within the input/output device. Further, in the case of channel programs, the repositioning of the input/output device occurs without any knowledge of which channel command word was last executed or which channel command word caused the failure of the program. One embodiment of how this is accomplished is described below.

The particular embodiment described herein references a channel program stored on a tape device. However, the invention is not limited to such programs or devices. The invention may be used with any type of program that is to be restarted or retried for any purpose, and with any type of devices, especially any devices that are position sensitive.

Figure 2:
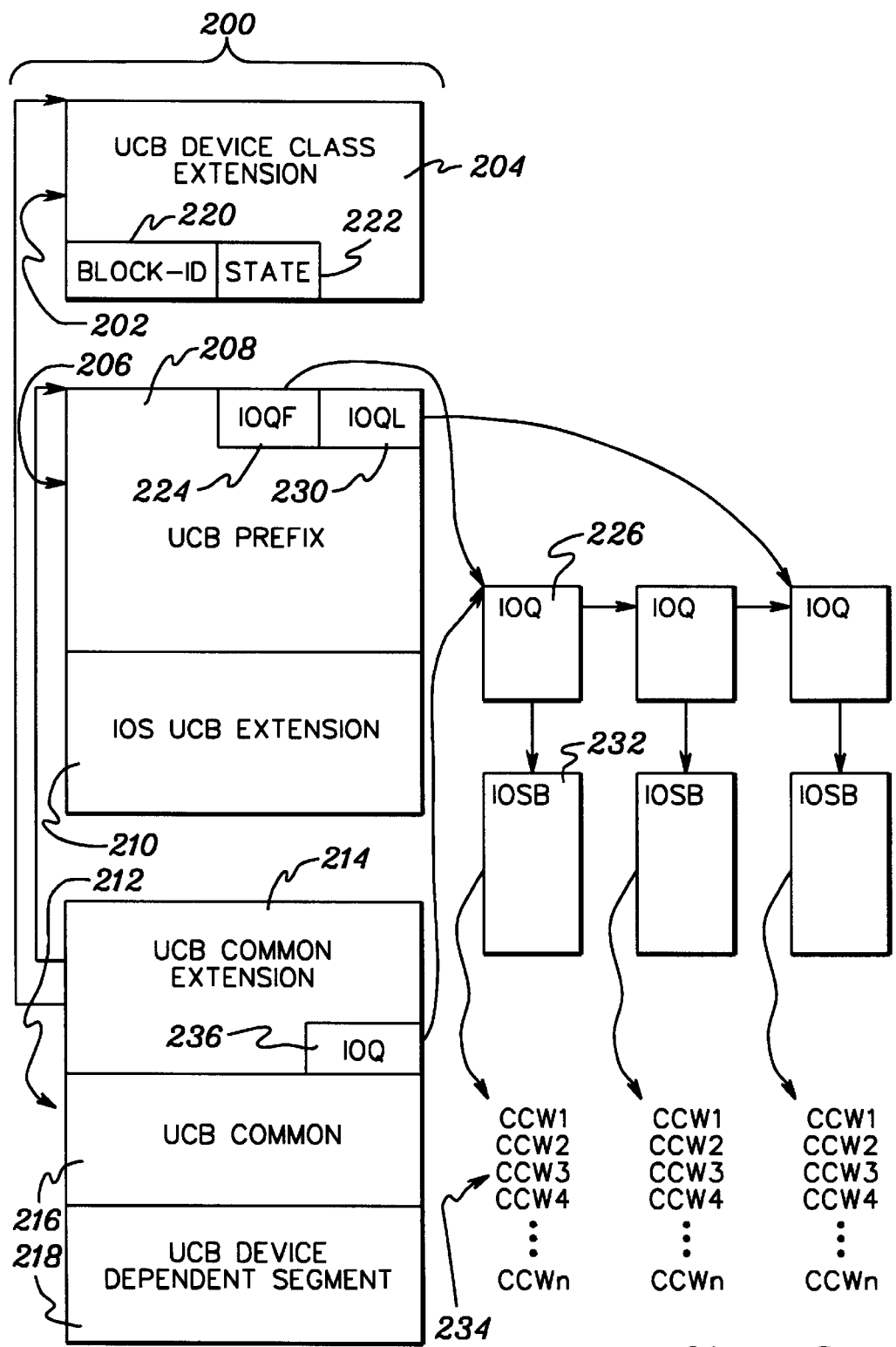
FIG. 2 depicts one example of a Unit Control Block used in accordance with the principles of the present invention.

In order to provide the repositioning capability of the present invention, the operating system employs control blocks, referred to as Unit Control Blocks (UCB), each of which is associated with an input/output device. The Unit Control Blocks are constructed by the operating system (e.g., the Input/Output Supervisor (IOS) of the MVS operating system) using the self-description data from the I/O devices, and stored in memory. One example of a Unit Control Block (UCB) is depicted in FIG. 2.

Unit Control Block 200 is used to represent the state of an input/output device 112 and is constructed, for instance, as three components: a Component 202, which includes a Unit Control Block Device Class Extension Area 204; a Component 206, which includes a Unit Control Block Prefix Area 208 and an I/O Supervisor UCB Extension Area 210; and a Component 212, which includes a Unit Control Block Common Extension Area 214, a UCE Common Area 216, and a UCB Device Dependent Segment 218.

UCB Device Class Extension Area 204 includes, in accordance with the principles of the present invention, a block-id 220, which indicates a physical position on the input/output device; and a state field 222, which specifies the state of the block-id. The valid states include current indicating that the block-id is current; last known value, not current specifying that the block-id is the last valid value, but it is not current; and invalid indicating that the block-id cannot be relied upon.

UCB Prefix Area 208 includes an I/O Request First Field (IOQF) 224 that points to a first I/O request block 226 in a chain of I/O request blocks; and an I/O Request Last Field (IOQL) 230 that points to the last I/O request block in the chain. There is an I/O request block for each I/O request (e.g., each channel program) that has been initiated.

Each I/O request block 226 points to a corresponding I/O Supervisor Block (IOSB) 232, which points to a list of the channel command words 234 associated with the I/O request or channel program.

I/O Supervisor UCB Extension Area 210 indicates state information used by the IOS component for managing the I/O operation.

UCB Common Extension Area 214 also includes an I/O request pointer 236 to the list of active I/O requests. Further, UCB Common Area 216 and UCB Device Dependent Segment 218 include pertinent information for the specific device associated with the UCB.

The Unit Control Block, and in particular, the block-id and state fields within the UCB Device Class Extension Area of the UCB are referenced and updated during the processing of the present invention, as described below with reference to FIGS. 3–9.

Figure 3:
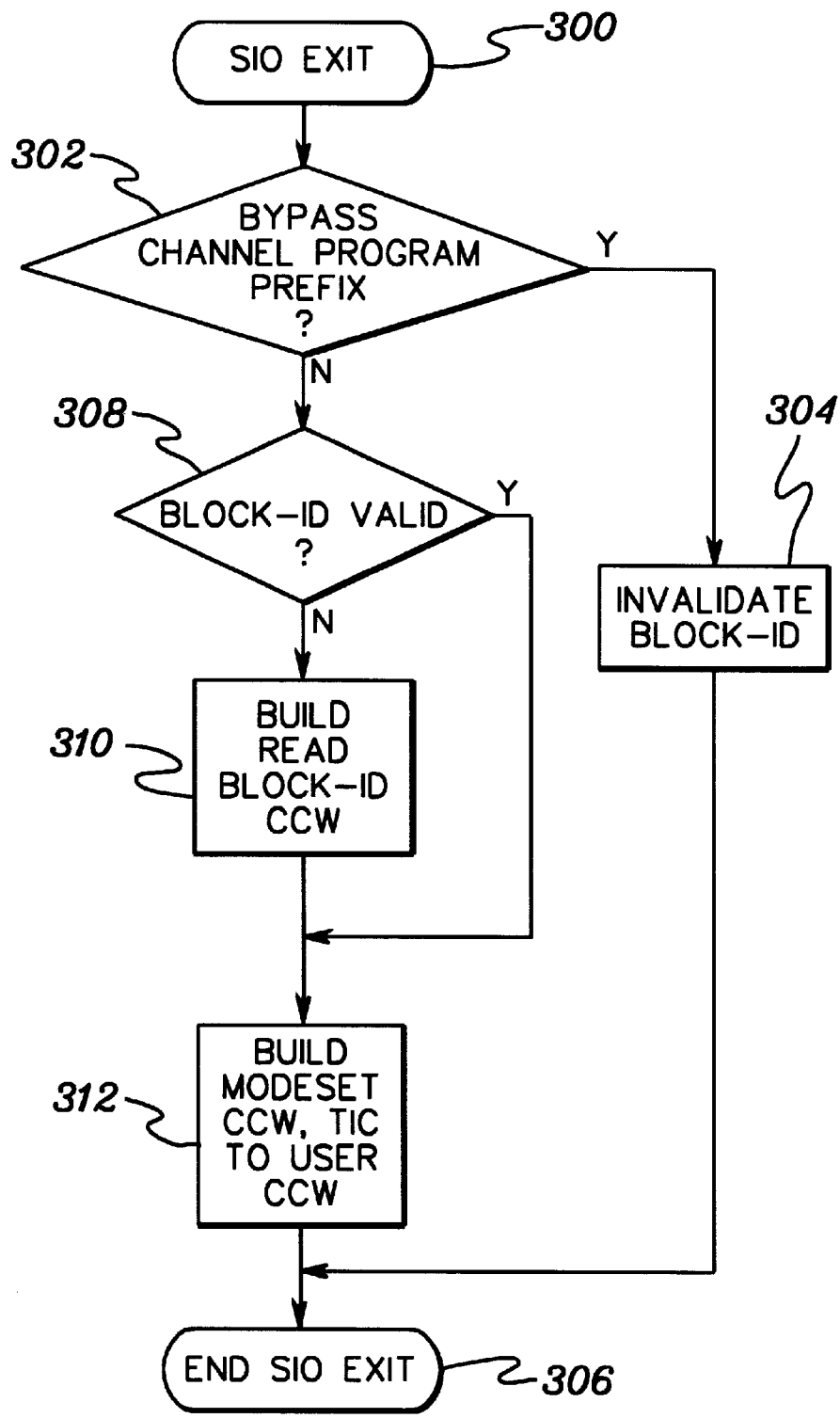
FIG. 3 depicts one embodiment of the logic associated with starting a channel program, in accordance with the principles of the present invention.

FIG. 3 describes one embodiment of the processing that occurs when a channel program is started for an input/output device. It is during this processing that the state of the position identifier (e.g., the block-id) is initialized.

Referring to FIG. 3, when a channel program is started for a device, a device dependent Start I/O exit (SIO) is invoked, STEP 300. During this exit, a determination is made as to whether the channel program is allowed to be prefixed, INQUIRY 302. This determination is made by checking an IOSBYP field stored within IOSB 232 (FIG.2). If the channel program prefix is to be bypassed, then block-id 220 is marked as invalid in the UCB corresponding to the device, STEP 304. Processing then returns to IOS to start the channel program, STEP 306. (In another embodiment, the block-id is not invalidated.)

On the other hand, if the I/O Requester does not require the channel program prefix to be bypassed, then a check is made to determine if the current block-id is valid, INQUIRY 308. If the current block-id is not valid, then the user channel program is prefixed with a read block-id command in order to place a valid block-id in the UCB, STEP 310. In particular, a channel command word is constructed that includes a command to read the current block-id of the channel program.

Thereafter, or if the current block-id is valid, then the channel program prefix is completed by constructing a modeset command and branching (via a transfer in channel (TIC)) to the user channel program, STEP 312. The modeset command is used to define certain parameters of execution for the channel program. In one embodiment, the modeset command may be required to be first in the chain of commands. If so, the modeset command is constructed first, and then the read block-id command is chained to it. Subsequently, processing is returned to IOS to start the channel program, STEP 306.

Figure 4:
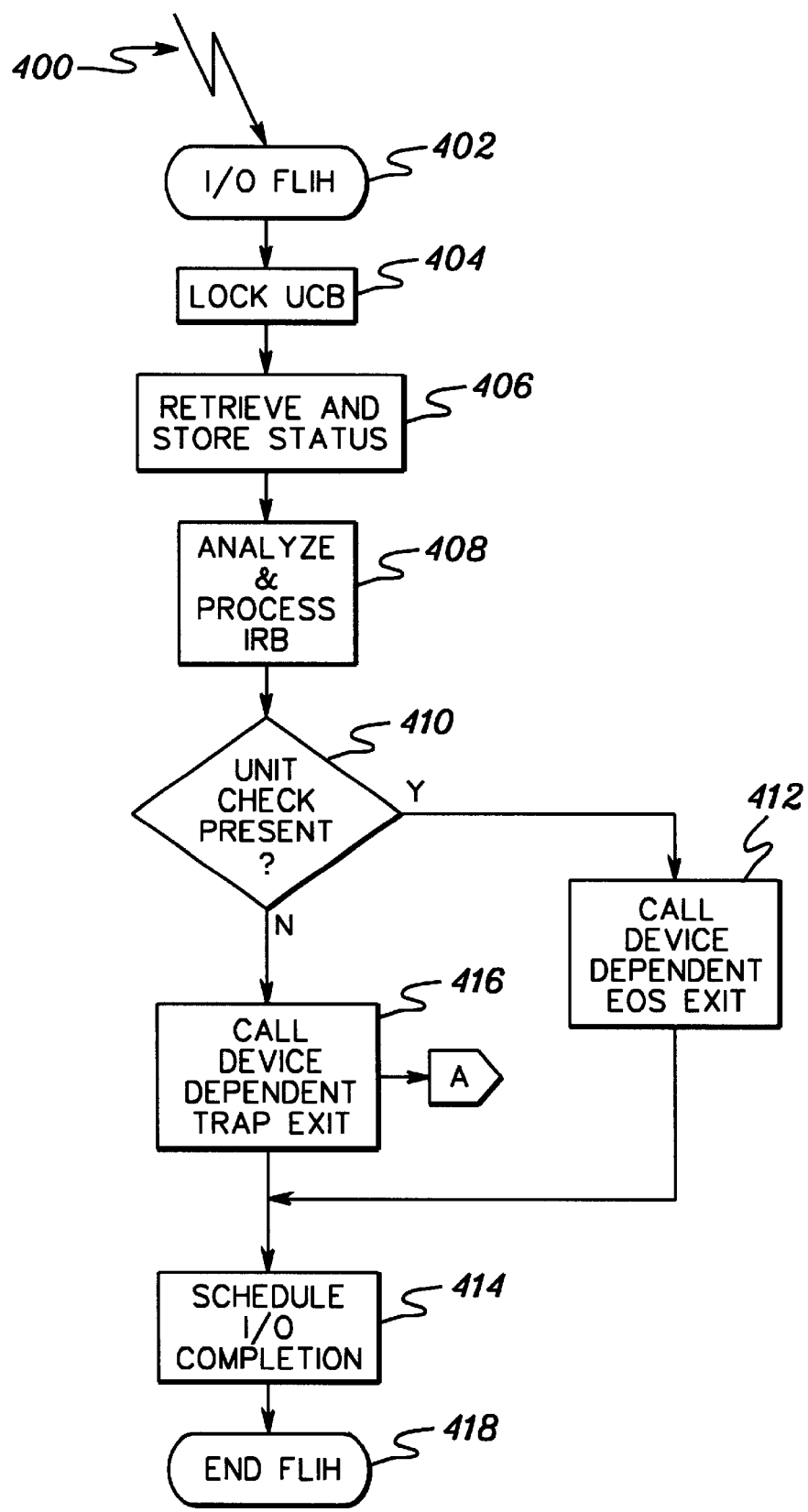
FIG. 4 depicts one embodiment of the logic associated with processing a First Level Interrupt Handler when the channel program of FIG. 3 completes, in accordance with the principles of the present invention.

When the channel program completes, an I/O interrupt is received by the operating system from the I/O device, STEP 400 (FIG. 4). Upon receipt of the I/O interrupt, an I/O First Level Interrupt Handler (FLIH) receives control in order to process the interrupt, STEP 402. In the ESA architecture, the interrupt identifies the device (subchannel) and returns a programming parameter that is used by OS/390 to locate the Unit Control Block that represents that device in the operating system.

Thereafter, the operating system obtains a lock on the UCB in order to serialize processing for the device, STEP 404. Subsequent to obtaining the lock, the operating system retrieves the status of the channel program and stores that status, STEP 406. In one example, the status is retrieved by issuing a Test Subchannel (TSCH) instruction, which stores the status in the form of an Interruption Response Block (IRB). The IRB contains detailed information about the channel program, any errors that may have occurred, and the address of the channel command word where the channel ended processing. For FICON attached devices, it may also include the address of the CCW last executed by the control unit.

Figure 5A:
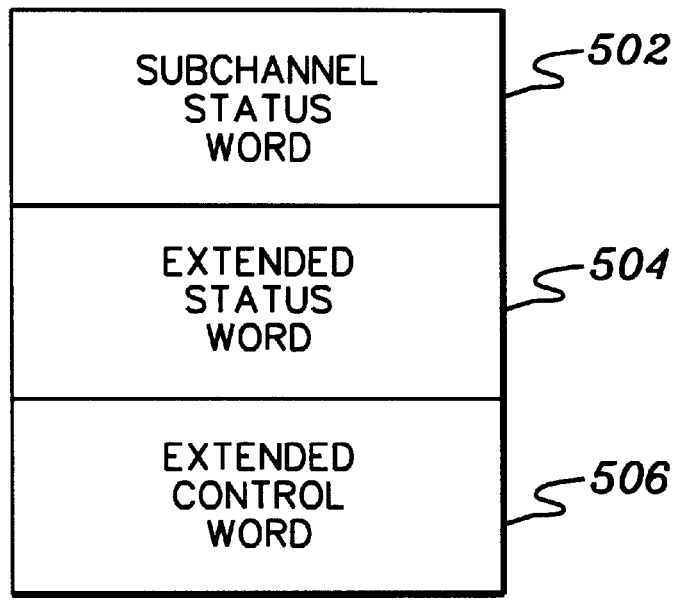
FIG. 5a depicts one example of an Interruption Response Block used in accordance with the principles of the present invention.
Figure 5B:
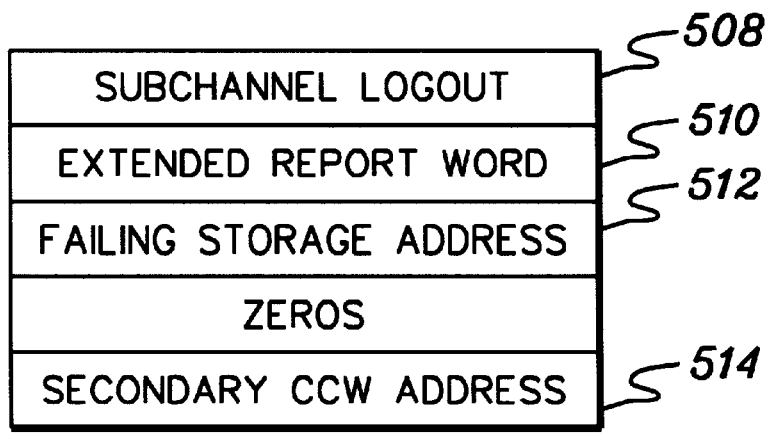
FIG. 5b depicts one example of the fields of an extended status word of the Interruption Response Block of FIG. 5a, in accordance with the principles of the present invention.

One example of an Interruption Response Block is depicted in FIG. 5a. Interruption Response Block 500 includes, for instance, a subchannel status word 502, which provides information regarding the status of a subchannel and its associated device; an extended status word 504, which provides additional status information about the subchannel and its associated device, as described further below with reference to FIG. 5b; and an extended control word 506, which provides additional information to the program describing conditions that may exist at the channel subsystem, subchannel or device.

Extended status word 504 includes, for instance, a subchannel logout field 508 (FIG. 5b) that provides detailed model-dependent information relating to a subchannel and describes equipment errors detected by the channel subsystem; an extended report word 510 that provides information to the program describing specific conditions that may exist at the device, subchannel or channel subsystem; a failing storage address 512 that indicates the address of the failing channel command word (as seen by the channel); and a secondary channel command word address that identifies, in accordance with the principles of the present invention, the point in the channel program execution achieved by the control unit when termination occurred.

Returning to FIG. 4, subsequent to storing the status in the Interruption Response Block, the I/O FLIH performs its traditional IRB analysis, processes errors and interacts with device support code and the I/O requester (or driver), as needed, STEP 408. Thereafter, a determination is made as to whether the ending status for the channel program included a unit check indicating that the control unit or device detected an unusual condition, INQUIRY 410. In one example, this determination is made by checking the status stored in the IRB.

If a unit check is present, then the sense data is retrieved from the device and control is passed to a conventional device dependent End-of-Sense (EOS) exit, STEP 412. When the I/O FLIH has finished processing the interrupt, the enabled I/O completion processing is scheduled, STEP 414. The completion processing includes notifying the I/O requester of the completion and performing any error recovery processing, if needed.

However, if unit check status is not returned for the channel program, INQUIRY 410, then the interrupt handler calls a device dependent trap exit, STEP 416. It is during this trap exit that the block-id representing the current position within the I/O device is calculated, in accordance with the principles of the present invention. Further details concerning the trap exit and how to determine the current media position are described below with reference to FIGS. 6–7.

Subsequent to processing the trap exit and when the I/O FLIH has finished processing the interrupt, the enabled I/O completion processing is scheduled, as described above, STEP 414. Processing of the First Level Interrupt Handler is then complete, STEP 418.

Figure 6:
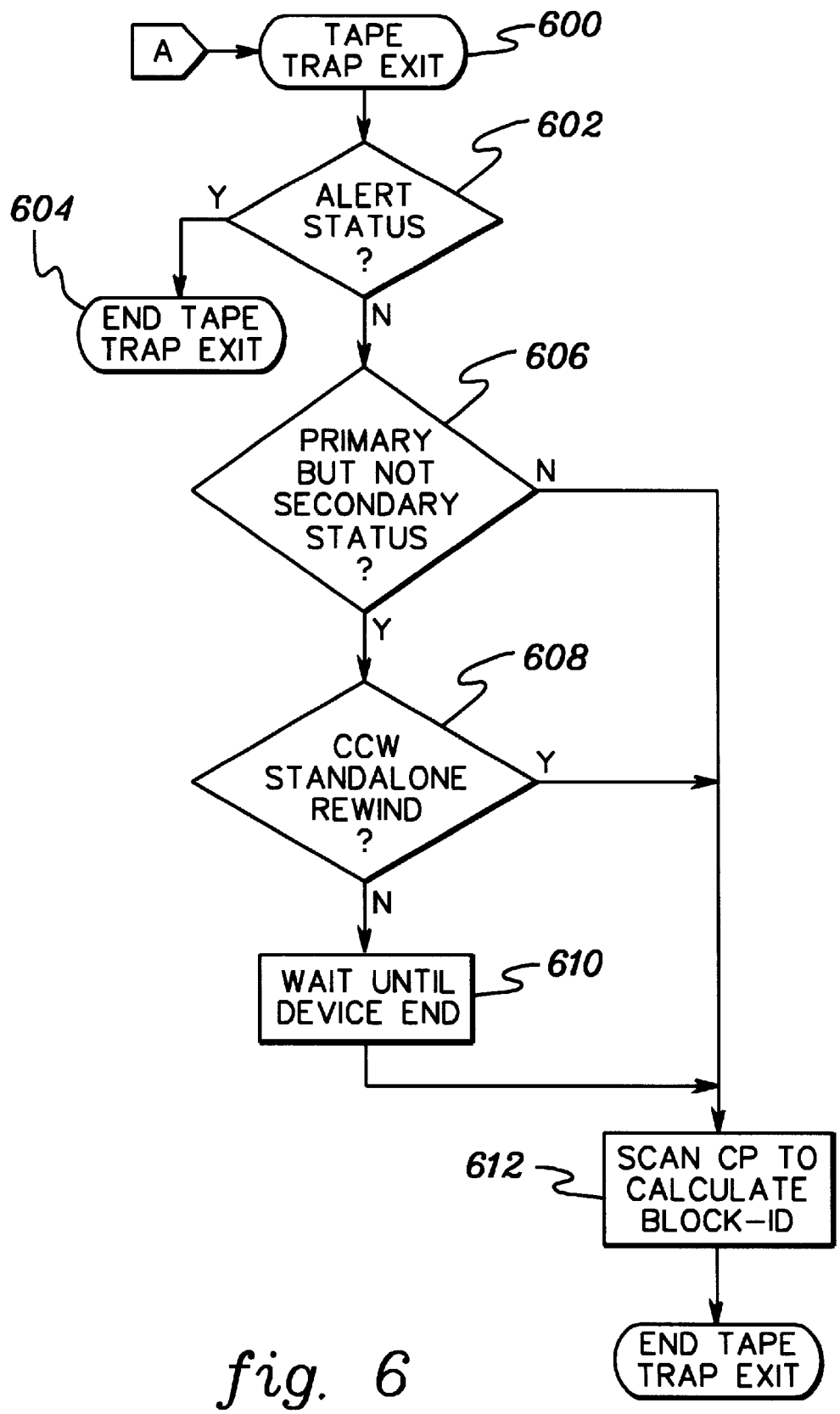
FIG. 6 depicts one embodiment of the logic associated with a device dependent trap exit called when a channel program completes, in accordance with the principles of the present invention.

As mentioned above, the device dependent trap exit is called whenever a channel program completes and there is no unit check in the device status, STEP 600 (FIG. 6). Initially, the trap exit checks to see if any errors have occurred, INQUIRY 602. In one embodiment, this is accomplished by checking an alert status field located within the subchannel status word of the Interruption Response Block. If an error has occurred, then processing ends, STEP 604, and control is returned to the I/O FLIH (STEP 414 of FIG. 4).

However, if no errors occurred, then the trap exit makes a determination as to whether the channel program is complete at both the channel and the device, INQUIRY 606. This determination is made by checking a primary status field and a secondary status field within the subchannel status word of the Interruption Response Block. When the channel program is complete at the channel end, then the primary status field is set, and similarly, when the channel program is complete at the device end, then the secondary status field is set.

If the operation is complete at the channel end, but not at the device, then a further determination is made as to whether a CCW standalone rewind instruction has been initiated. This instruction tells the operating system to do a rewind of the tape, ensure the job is complete and then, unload the tape. If such an instruction is initiated, then it is not desirable to wait for the device to complete. Thus, processing continues with STEP 612. However, if this instruction is not initiated, then processing waits until the device ends, STEP 610.

When the device ends (e.g., IOQMERGE indication set in a return code), or when there is no standalone rewind, INQUIRY 608, or when the channel program is complete at both the channel end and the device end, INQUIRY 606, then the channel program is scanned to calculate the new block-id within the I/O device representing past the ending position of the channel program, STEP 612. It is this block-id that represents the beginning of the next channel program and is used to restart the next channel program, should the next channel program need to be retried.

Figure 7:
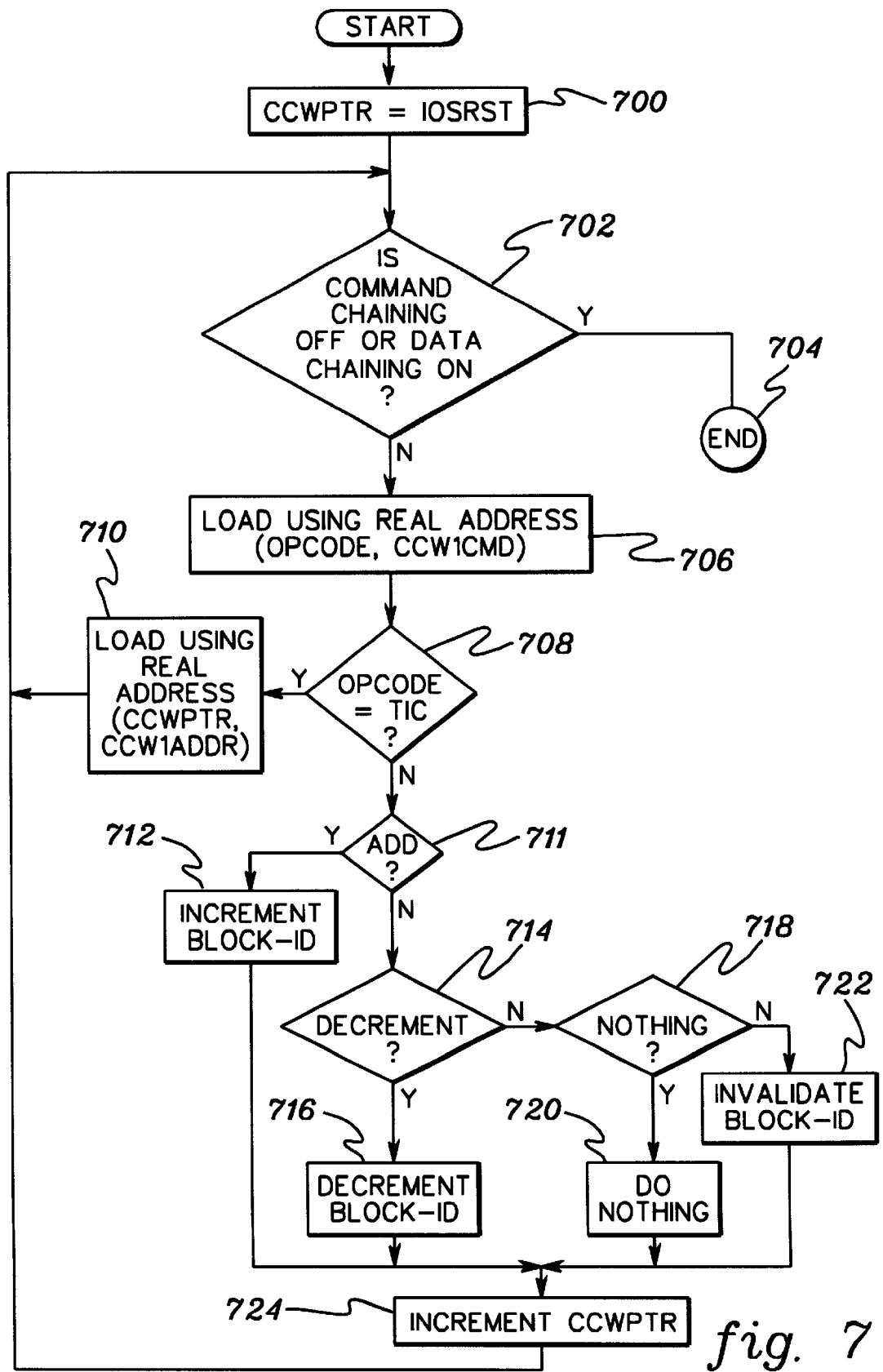
FIG. 7 depicts one embodiment of the logic associated with determining a position identifier within an input/output device to be used to restart a program, in accordance with the principles of the present invention.

One example of how to determine the new block-id is described with reference to FIG. 7. In this embodiment, it is assumed that the channel command word is a Format-1 (31-bit addressing) channel command word. However, the same logic is used for Format-0 channel command words. Format-1 and Format-0 channel command words include the same information, but the fields are arranged differently.

Initially, a variable referred to as CCWPTR is set equal to IOSRST, which is the real address of the channel program that just completed, STEP 700. Thereafter, a determination is made as to whether command chaining is off or data chaining is on for the first channel command word of the channel program, INQUIRY 702. In one example, this determination is made by checking the chain data and chain command fields of the channel command word. If command chaining is off or data chaining is on, then the process is complete, STEP 704.

On the other hand, if command chaining is on and data chaining is off, then a load using real address instruction is issued to obtain the opcode of the first channel command word of the channel program, STEP 706. If the opcode is a transfer in channel (TIC) (i.e., a branch within the channel program), INQUIRY 708, then another load using real address instruction is issued, STEP 710. This time the real address of the first channel command word is loaded in the variable referred to as CCWPTR. Thereafter, flow returns to INQUIRY 702 for the next channel command word of the channel program.

Returning to INQUIRY 708, if the opcode is not a transfer in channel, then checks are made to determine whether the block-id is to be incremented, decremented, unchanged or invalidated. An opcode array is used for these determinations. For example, the opcode array includes a list of possible commands and for each command, there is a one byte entry. Each one byte entry has four bits, one for add (A), decrement (D), do nothing (N), and invalidate (I). One example of the array is as follows:

| Command | A, D, N, I |
|---|---|
| Read | 1, 0, 0, 0 |
| Write | 1, 0, 0, 0 |
| Read Previous | 0, 1, 0, 0 |
| No-Operation | 0, 0, 1, 0 |
| Forward Space File | 0, 0, 0, 1 |
| Rewind | 0, 0, 0, 1 |

Initially, a determination is made as to whether the opcode of the channel command word represents a command that causes the block-id to be incremented, INQUIRY 711. If it is such a command (e.g., a read or a write), then the block-id is incremented by one, STEP 712. However, if the opcode represents a command that causes the block-id to be decremented, INQUIRY 714, then the block-id is decremented by one, STEP 716.

If the block-id is not to be incremented or decremented, then a determination is made as to whether the command should cause no change in the block-id, INQUIRY 718. If so, then nothing is done to the block-id, STEP 720. However, if the command does not cause an add, decrement or do nothing to the block-id, then the block-id is invalidated, STEP 722. Thereafter, the CCWPTR is incremented (e.g., by 8) to point to the next channel command word of the channel program, STEP 724. Processing then continues with INQUIRY 702.

At the completion of the scan through the channel program, the status of the block-id is known. It is either invalid or representative of the beginning of the next channel program to be executed. This status is stored in the IRB.

Figure 8:
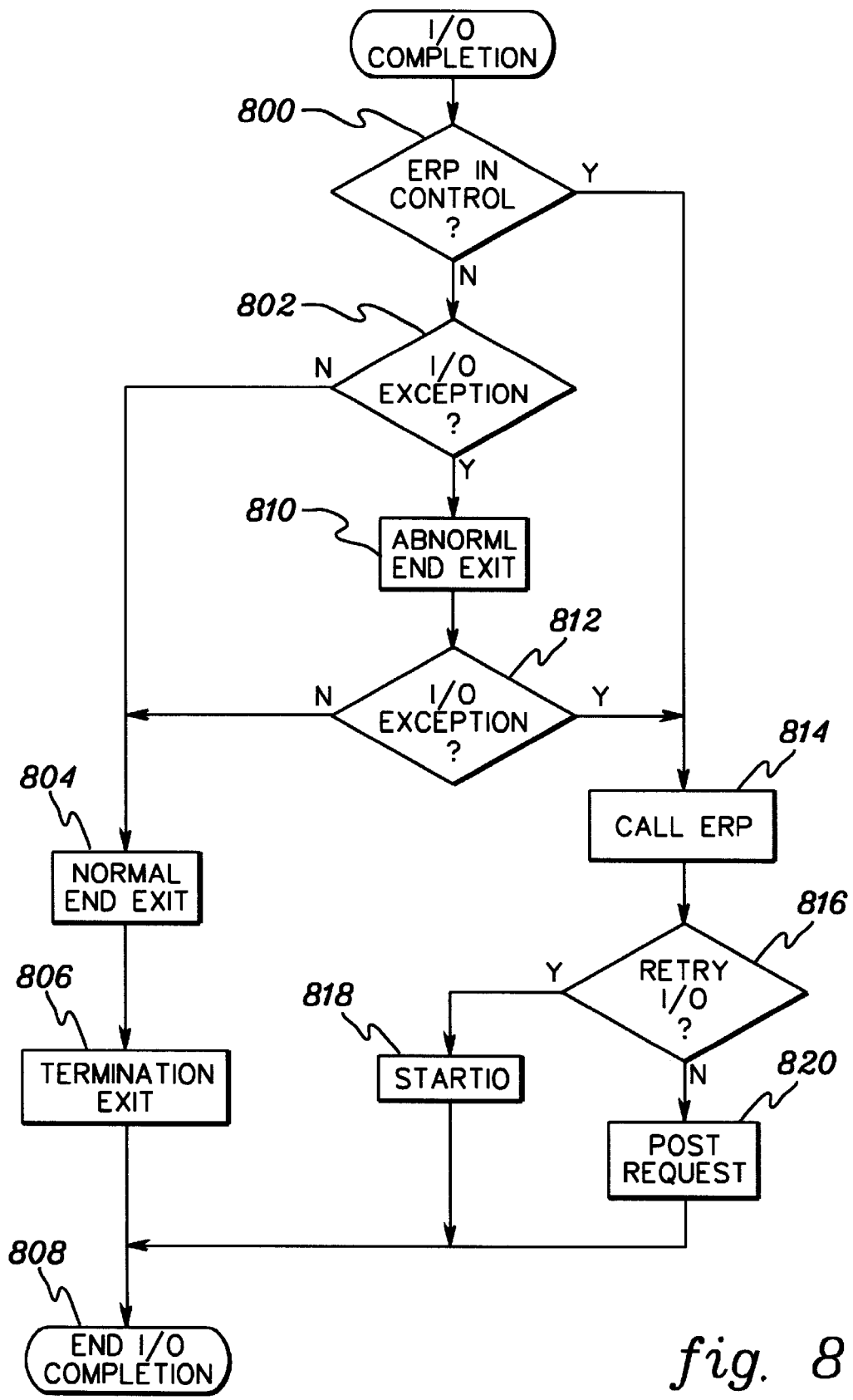
FIG. 8 depicts one embodiment of the logic associated with completing a channel program, in accordance with the principles of the present invention.

After the channel program is complete, the status analyzed and all dependent exits invoked (FIG. 1), the I/O requester is notified of the completion of the channel program from the enabled backend processing (IOS Post Status processing), which is described with reference to FIG. 8.

Initially, a determination is made as to whether the device error recovery procedure (ERP) is already in control, INQUIRY 800. If it is not in control, then the device status, located in the Interruption Response Block, is checked to see if any error occurred, INQUIRY 802. If no errors occurred the I/O requester is notified that the I/O completed normally by entering the driver normal end exit, STEP 804. After the driver normal end exit has finished processing, IOS cleans up resources that may have been obtained for the channel program and enters a driver termination exit, STEP 806. Processing then terminates, STEP 808.

If an I/O error has occurred, INQUIRY 802, then the driver abnormal end exit is entered in order to handle the abnormal end, STEP 810. The abnormal end exit determines whether the error needs to be processed, INQUIRY 812. If the error is of a type that it does not need to be processed, then control passes to the normal end exit, STEP 804. However, if the abnormal end exit confirms that the error needs to be processed, then control is given to the device error recovery procedure, STEP 814, which is described in detail below with reference to FIG. 9.

Further, returning to INQUIRY 800, if the device error recovery procedure is already active, then control is returned to the error recovery procedure, STEP 814. This happens, for example, after a retry of a channel program has completed.

If the device error recovery procedure determines that the channel program can be retried, INQUIRY 816, then a STARTIO service is invoked to initiate the retry, STEP 818. In accordance with the principles of the present invention, in order to retry the channel program, the I/O device is repositioned to the block-id calculated above.

However, if the error is to be considered permanent, or a previous retry was successful, then the I/O driver is notified, STEP 820, and processing terminates, STEP 808.

Figure 9:
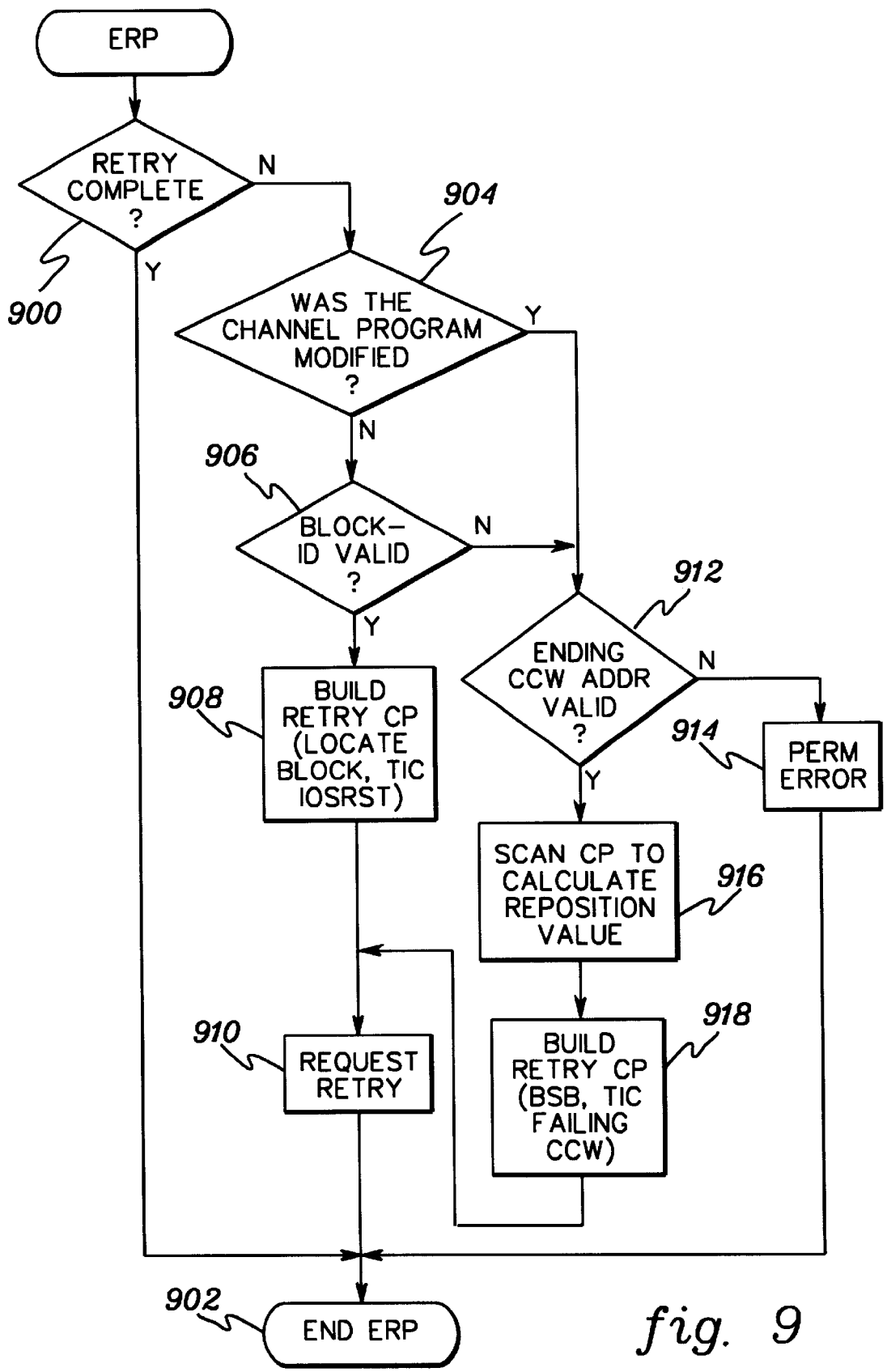
FIG. 9 depicts one embodiment of the logic associated with performing error recovery for a channel program, in accordance with the principles of the present invention.

One embodiment of the device error recovery procedure called in the above logic is described below with reference to FIG. 9. When the device error recovery procedure (ERP) is entered, it first checks to see if it is being called with the results of a previous retry, INQUIRY 900. If so, resources obtained for the purpose of the retry are freed and control is returned to the IOS post status process, STEP 902, which was described with reference to FIG. 8.

If, however, the ERP has not been entered for the results of a previous retry, processing continues by checking to see whether the I/O requester has indicated that the channel program has been modified by the program during execution, INQUIRY 904. The I/O driver specifies this by setting a specific indicator (IOSXCPNM) in an IOS request block.

If the channel program was not modified during execution, then a determination is made to see if the block-id saved in the UCB is currently valid, as determined by the device trap exit, INQUIRY 906. If the block-id is valid, then the retry channel program is built, STEP 908. In particular, the retry channel program includes a Locate Block command to reposition the input/output device to the position at the start of the failing channel program. Further, it includes a transfer to the original user channel program (e.g, a TIC to IOSRST) to attempt the request again. Control is then returned to IOS with an indication to issue the retry channel program, STEPS 910, 902.

However, if the block-id is not valid, INQUIRY 906, or if the channel program may have been modified by the driver, INQUIRY 904, then the recovery is attempted by examining the ending channel program address, STEP 912. In particular, the interrupt status of the IRB is examined to determine if the ending CCW address is valid or not. There may be two ending CCW addresses with FICON attached devices. The traditional ending CCW address represents where the channel stopped processing the program (e.g., at which CCW). The second CCW address, if present, indicates where the control unit stopped processing the program (again, at which CCW). If the ending CCW addresses are not valid, the error is considered permanent, STEP 914, and processing terminates, STEP 902.

On the other hand, if the ending CCW addresses are valid, then the ERP determines how to reposition the input/output device and retry the failing CCW. If there are two different ending CCW addresses, then the channel program is scanned from the first failing CCW address to the second failing CCW address, STEP 916. During the scan, it calculates the number of records to be used in repositioning the input/output device. Consider the following example:

1. MODESET
2. READ 4K
3. READ 4K<--------> channel fails here
4. READ 4K
5. READ 4K<--------> device position
6. READ 4K In the above example, the ERP sees that the 2nd CCW address points to the (5) read, and the channel points to the (3) read. The ERP scans the channel program to see that there are 3 commands between the two CCW addresses, (3), (4), and (5). The ERP backspaces three blocks before resuming the channel program.

If there is a single failing CCW address, the ERP determines whether to move the input/output device forward or backward a single record, based on traditional processing of the interrupt status.

Thereafter, a retry channel program is built to reposition the input/output device, STEP 918. For example, the channel program is built by using Back-Space-Block (BSB) commands and a TIC to the failing CCW. The Back-Space-Block commands tells the media how much to back up.

Subsequently, control is returned to IOS to retry the failing channel program from the point of failure, STEPS 910, 902.

Described in detail above, is a mechanism for repositioning I/O devices in order to retry programs, such as channel programs. In one example, the I/O device is repositioned without any knowledge of where the failing program ended. Additionally, in the case of a channel program, the I/O device is repositioned without any knowledge of which channel command word was the last to execute. Further, in other limited circumstances, such as where there is an invalid block-id or the program has been modified, a position identifier is determined by using one or more addresses associated with the failing program (e.g., one or more CCW addresses). This allows some errors that were once considered permanent, to be recovered therefrom.

The computing environment described above is only one example of a computing environment that can incorporate and use the repositioning capability of the present invention. The capability of the present invention is equally applicable to other architectures, as well as other types of environments. For example, in another environment, the storage control element can be eliminated and instead, both the main storage and the central processing unit(s) are directly coupled to the channel subsystem. Other variations are also possible without departing from the spirit of the present invention.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of repositioning within an input/output device, said method comprising:

ascertaining that a program, that was executing on an input/output device sensitive to positioning, is to be retried; and repositioning said input/output device to a predetermined position in order to retry said program, wherein said repositioning is performed without knowledge of current positioning within said input/output device and without knowledge of which part of the program caused the retry.

2. The method of claim 1, wherein said repositioning further comprises:
   determining whether said predetermined position is valid; and
   repositioning to said predetermined position when said predetermined position is valid.

3. The method of claim 1, further comprising determining said predetermined position.

4. The method of claim 1, further comprising retrying said program, after said repositioning.

5. The method of claim 1, wherein said program is a channel program comprising one or more channel command words.

6. The method of claim 5, wherein said repositioning lacks knowledge of which channel command word of said channel program failed.

7. The method of claim 1, wherein said part of the program comprises a command of the program.

8. A method of repositioning within an input/output device, said method comprising:
   ascertaining that a program, that was executing on an input/output device sensitive to positioning, is to be retried;
   repositioning said input/output device to a predetermined position in order to retry said program, wherein said repositioning is performed without knowledge of current positioning within said input/output device; and
   determining said predetermined position, wherein the determining comprises:
      scanning a previously executed program for a command;
      adjusting a position identifier of said input/output device based upon a type of said command; and
      repeating said scanning and said adjusting until a prespecified limit is reached, wherein said position identifier then represents said predetermined position.

9. The method of claim 8, wherein said scanning comprises scanning a previously successfully executed program.

10. The method of claim 8, wherein said adjusting comprises:
    incrementing said position identifier when said command is an Add type;
    decrementing said position identifier when said command is a Delete type; and
    invalidating said position identifier when said command is an Invalidate type.

11. The method of claim 8, further comprising ensuring, prior to said determining, said position identifier is valid, wherein said determining begins with a valid position identifier.

12. The method of claim 8, further comprising storing said position identifier in a control block associated with said input/output device for use during said repositioning.

13. The method of claim 12, further comprising storing a state associated with said position identifier in said control block.

14. The method of claim 8, wherein said prespecified limit is an end of said previously executed program.

15. A method of repositioning within an input/output device, said method comprising:
    ascertaining that a program, that was executing on an input/output device sensitive to positioning, is to be retried, wherein said program is a channel program comprising one or more channel command words;
    repositioning said input/output device to a predetermined position in order to retry said program, wherein said repositioning is performed without knowledge of current positioning within said input/output device; and
    determining said predetermined position, said determining comprising:
       scanning a previously executed channel program for a channel command word;
       adjusting a block-id of said input/output device based upon a type of operand of said channel command word; and
       repeating said scanning and said adjusting for each channel command word of said previously executed channel program, wherein said block-id then represents said predetermined position.

16. A method of repositioning within an input/output device, said method comprising:
    determining a position, within an input/output device sensitive to positioning, that is to be used to retry a program, wherein said determining uses a first address representative of where a channel associated with said input/output device stopped processing said program and a second address representative of where a control unit associated with said input/output device stopped processing said program; and
    repositioning said input/output device to said position in order to retry said program.

17. A method of repositioning within an input/output device, said method comprising:
    determining a position, within an input/output device sensitive to positioning, that is to be used to retry a program, wherein said determining uses a first address representative of where a channel associated with said input/output device stopped processing said program and a second address representative of where a control unit associated with said input/output device stopped processing said program, wherein said determining comprises:
       scanning said program from said first address to said second address;
       and calculating, during said scanning, a number of records to be used to reposition said input/output device; and
    repositioning said input/output device to said position in order to retry said program.

18. A method of repositioning within an input/output device, said method comprising:
    ascertaining that a program, that was executing on an input/output device sensitive to positioning, is to be retried;
    repositioning said input/output device to a predetermined position in order to retry said program, wherein said repositioning is performed without knowledge of current positioning within said input/output device and without knowledge of which part of the program caused the retry; and
    determining said predetermined position, wherein said determining comprises:
       scanning a previously executed program for a command;
       adjusting a position identifier of said input/output device based upon a type of said command; and
       repeating said scanning and said adjusting until a prespecified limit is reached, wherein said position identifier then represents said predetermined position.

19. A method of repositioning within an input/output device, said method comprising:

ascertaining that a program, that was executing on an input/output device sensitive to positioning, is to be retried, wherein said program is a channel program comprising one or more channel command words;

repositioning said input/output device to a predetermined position in order to retry said program, wherein said repositioning is performed without knowledge of current positioning within said input/output device and without knowledge of which part of the program caused the retry; and determining said predetermined position, said determining comprising:

scanning a previously executed channel program for a channel command word;

adjusting a block-id of said input/output device based upon a type of operand of said channel command word; and repeating said scanning and said adjusting for each channel command word of said previously executed channel program, wherein said block-id then represents said predetermined position.

* * * * *